Figure 1:
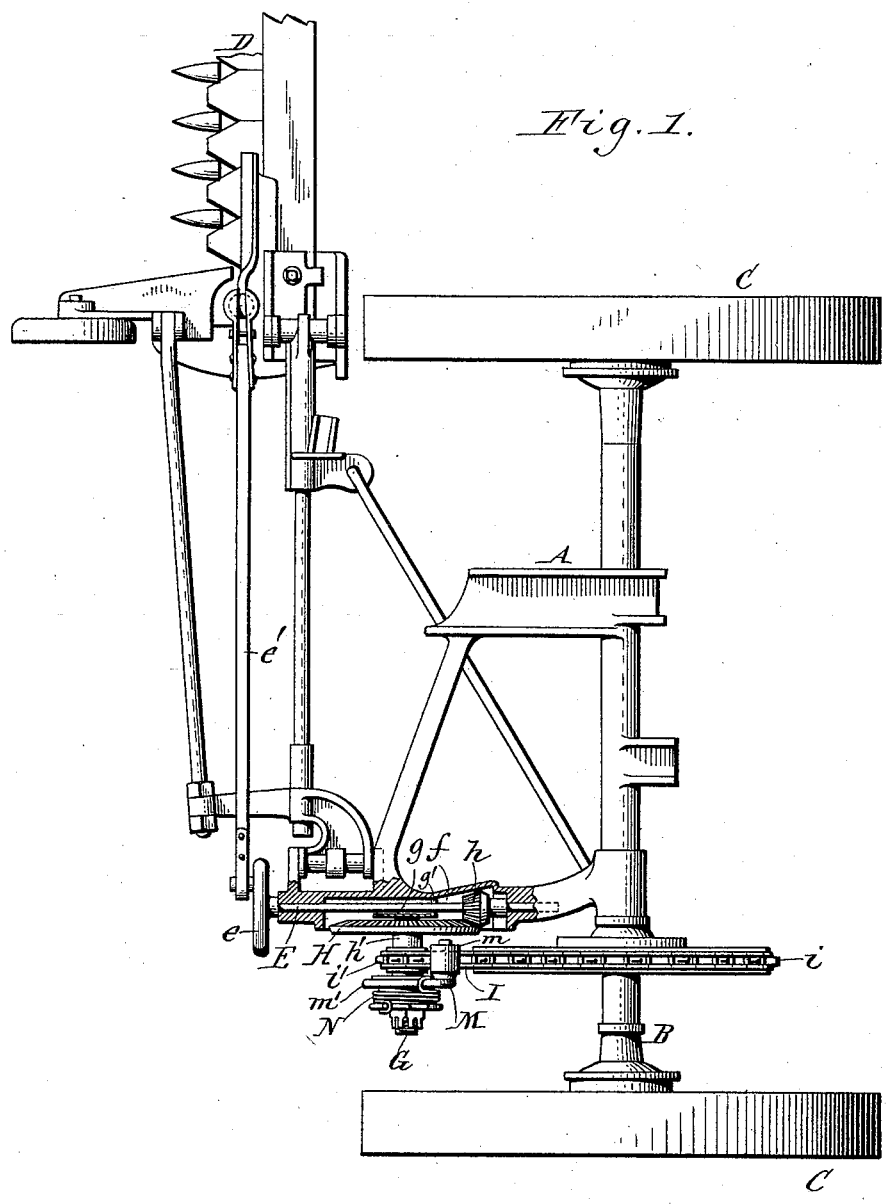

(No Model.) 2 Sheets—Sheet 1.

W. H. RUEF.
DRIVE CHAIN TIGHTENER.

No. 601,417. Patented Mar. 29, 1898.

Witnesses:
Henry L. Deck.
Chas. F. Burkhardt.

W. H. Ruef Inventor
By Wilhelm Bruner
Attorneys.

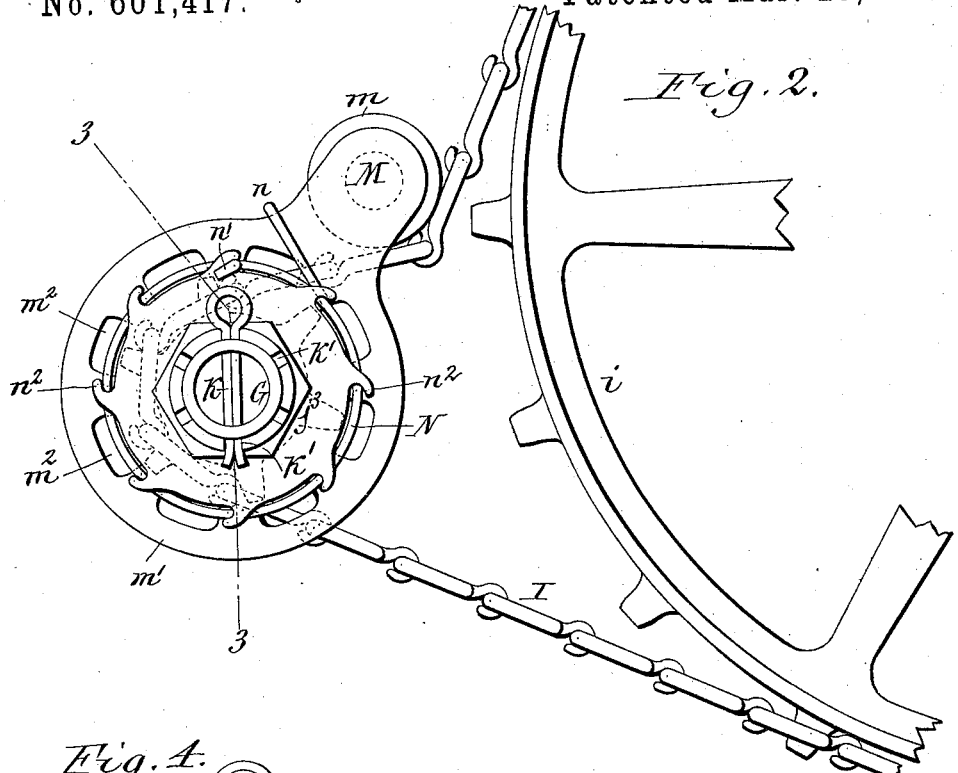
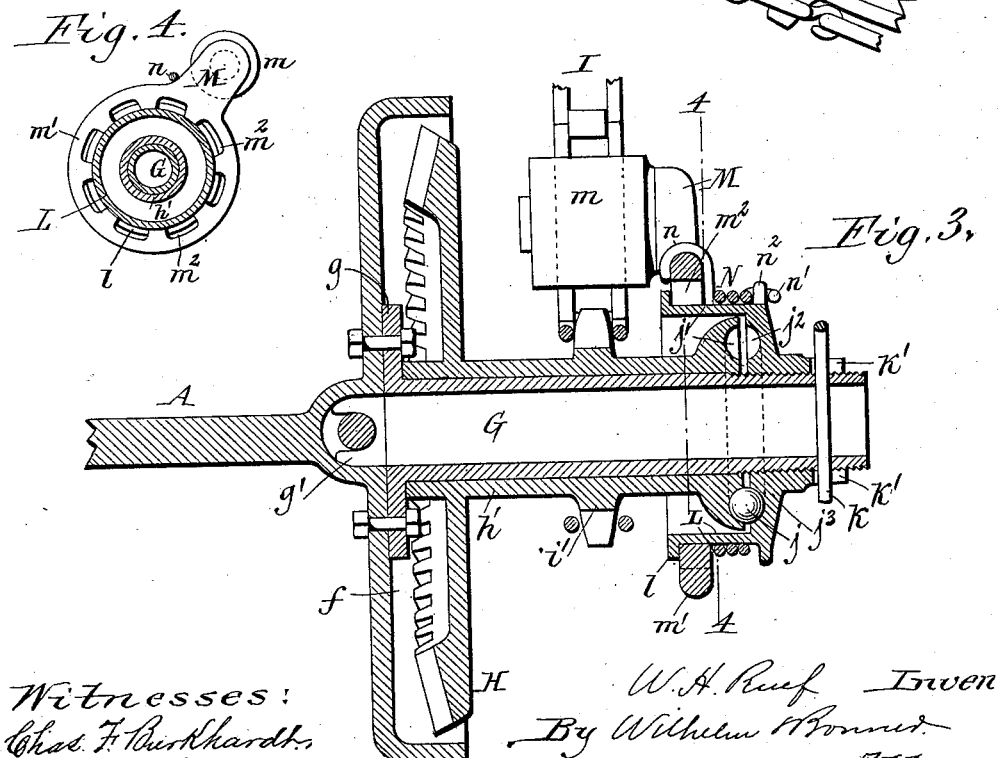

UNITED STATES PATENT OFFICE.

WILLIAM H. RUEF, OF POUGHKEEPSIE, NEW YORK, ASSIGNOR TO THE ADRIANCE, PLATT & COMPANY, OF SAME PLACE.

DRIVE-CHAIN TIGHTENER.

SPECIFICATION forming part of Letters Patent No. 601,417, dated March 29, 1898.

Application filed December 15, 1897. Serial No. 661,987. (No model.)

*To all whom it may concern:*

Be it known that I, WILLIAM H. RUEF, a citizen of the United States, residing at Poughkeepsie, in the county of Dutchess and State of New York, have invented a new and useful Improvement in Drive-Chain Tighteners, of which the following is a specification.

The object of my invention is the production of a simple and reliable drive-chain or belt tightener which can be easily and conveniently assembled and adjusted and which is particularly desirable for tightening the drive-chain of a mowing-machine.

In the accompanying drawings, consisting of two sheets, Figure 1 is a fragmentary top plan view of a mowing-machine provided with my improved chain-tightener. Fig. 2 is a fragmentary side elevation, on an enlarged scale, of the chain-tightener. Fig. 3 is a vertical transverse section in line 3 3, Fig. 2. Fig. 4 is a vertical section, on a reduced scale, in line 4 4, Fig. 3.

Like letters of reference refer to like parts in the several figures.

A represents the mower-frame, B the axle journaled in the same, and C the ground or driving wheels.

D represents the cutter-bar, E the longitudinal shaft journaled in the frame and provided at its front end with a crank-disk $e$, and $e'$ the pitman connecting the crank-disk with the cutter-bar. The central portion of the longitudinal shaft is arranged in a cavity $f$ in the frame A, which cavity is open on its outer side or toward the adjacent ground-wheel.

G represents a hollow arbor or stud arranged parallel with the axle and provided at its inner end with an annular flange $g$, by which it is secured in the cavity $f$ above and below the longitudinal shaft, so that the axis of the arbor or stud is in the same horizontal plane with that of the shaft. This flange is provided with a recessed lug $g'$, which straddles the shaft.

H is a bevel gear-wheel mounted on the arbor and arranged in the cavity and meshing with a bevel gear-pinion $h$, which is secured to the longitudinal shaft within the rear portion of the cavity. The bevel gear-wheel is formed on the inner end of a sleeve $h'$, which is journaled on the arbor. Motion is transmitted from the axle to the bevel gear-wheel and connecting parts by a chain belt or drive-chain I passing around a large sprocket-wheel $i$ on the axle and a sprocket-pinion or small wheel $i'$ on the central portion of the sleeve $h'$. The outward axial thrust of the bevel gear-wheel is taken up by one or more balls $j$, arranged in an annular groove $j'$ in the outer end of the sleeve $h'$ and a similar groove $j^2$ in the inner side of a cap $j^3$, which is screwed upon the outer end of the arbor. The ball-bearing is adjusted and the wear is taken up by turning the cap on the arbor. After adjustment the cap is held in position by a cotter-pin $k$, which passes transversely through openings in the arbor and engages with notches $k'$ in the outer end of the cap. These notches are arranged annularly and in pairs on the cap, and the end of the cotter-pin may be shifted from one pair of notches to another upon turning the cap. The device whereby the chain belt is tightened is constructed as follows:

L represents a cylindrical hood or barrel which extends inwardly from the marginal portion of the cap $j^3$ and which is provided at its inner end with an external annular flange $l$.

M is a tightener-arm having a roller $m$ at its outer end which bears against the upper portion of the chain belt and having a hub $m'$, which is journaled on the supporting-barrel adjacent to its flange $l$.

N represents a tightener-spring which is coiled around the supporting-barrel. This spring is provided at one end with a hook $n$, which engages with the tightener-arm, and at the other end with a hook $n'$, which engages with one of an annular row of hooks $n^2$ on the outer end of the supporting-barrel. The tension of this spring turns the tightener-arm in the direction for pressing the tightener-roller downwardly against the chain belt between the sprocket-wheel and pinion, whereby the slack in the chain belt is automatically taken up and the belt is wrapped to a greater extent around the sprocket-pinion. Upon shifting the spring from one hook on the barrel to another the tension of the spring can be changed.

In order to permit of slipping the hub of the tightener-arm over the hooks on the supporting-barrel, the bore of the tightener-arm hub is provided with an annular row of notches $m^2$, corresponding to the hooks on the barrel. For assembling the parts the tightener-arm is placed with the notches in its hub in alinement with the hooks of the barrel and then slipped inwardly over the hooks and upon the barrel until the hub of the arm bears against the inner flange $l$ of the barrel. The spring is then placed on the barrel and connected with one of the hooks on the latter and with the tightener-arm.

I claim as my invention—

1. The combination with the arbor, the driven wheel journaled on said arbor, and the chain belt passing around said wheel, of a supporting-barrel secured to the outer portion of said arbor, a tightener-arm journaled on said barrel and provided with means for engaging with the chain belt, and a coiled spring applied to the outer side of said barrel and attached to the tightener-arm and the barrel, substantially as set forth.

2. The combination with the arbor, the driven wheel journaled on said arbor and the chain belt passing around said wheel, of a supporting-barrel provided with an annular row of hooks, a tightener-arm journaled on the barrel, having means for engagement with the chain belt and provided in its bore with notches which permit the arm to be slipped over the hooks of the barrel, and a spring mounted on the barrel and connected to the tightener-arm and to one of said hooks, substantially as set forth.

3. The combination with the arbor, the driven wheel and the chain belt passing around said wheel, of an internally-threaded cap arranged on the externally-threaded portion of the arbor and receiving the end thrust, a cotter-pin arranged in the arbor and engaging with notches in the end of the cap, a supporting-barrel secured to said cap and provided with an annular row of hooks, a tightener-arm journaled on the barrel, having means for engagement with the chain belt and provided in its bore with notches which permit the arm to be slipped over the hooks of the barrel, and a spring mounted on the barrel and connected to the tightener-arm and to one of said hooks, substantially as set forth.

Witness my hand this 11th day of December, 1897.

WILLIAM H. RUEF.

Witnesses:
WM. A. ADRIANCE,
TUNIS ACKERMAN.